(12) United States Patent
Gierer et al.

(10) Patent No.: US 7,771,317 B2
(45) Date of Patent: Aug. 10, 2010

(54) CONTROL VALVE ASSEMBLY FOR CONTROLLING A STARTING CLUTCH OF AN AUTOMATIC TRANSMISSION

(75) Inventors: Georg Gierer, Kressbronn (DE); Thilo Schmidt, Meckenbeuren (DE); Anton Fritzer, Markdorf (DE); Markus Herrmann, Scheidegg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 282 days.

(21) Appl. No.: 12/088,880

(22) PCT Filed: Oct. 13, 2006

(86) PCT No.: PCT/EP2006/009904

§ 371 (c)(1),
(2), (4) Date: Apr. 1, 2008

(87) PCT Pub. No.: WO2007/045401

PCT Pub. Date: Apr. 26, 2007

(65) Prior Publication Data

US 2008/0234099 A1    Sep. 25, 2008

(30) Foreign Application Priority Data

Oct. 21, 2005  (DE) .................. 10 2005 050 493

(51) Int. Cl.
*B60W 10/02* (2006.01)
*F16H 61/26* (2006.01)

(52) U.S. Cl. .................. 477/175; 477/159; 477/906

(58) Field of Classification Search ............. 477/79, 477/80, 88, 143, 145, 146, 148, 152, 159, 477/163, 164, 169, 174, 175, 906
See application file for complete search history.

(56) References Cited

U.S. PATENT DOCUMENTS

| 5,399,130 A | * | 3/1995 | Long ..................... 477/130 |
| 5,509,868 A | * | 4/1996 | Eaton .................... 477/130 |
| 5,944,626 A | | 8/1999 | Spiess et al. |
| 6,467,262 B1 | | 10/2002 | Baeuerle |
| 7,163,096 B2 | | 1/2007 | Neuner |
| 2007/0123388 A1 | | 5/2007 | Petrzik et al. |

FOREIGN PATENT DOCUMENTS

| DE | 196 09 785 A1 | 9/1997 |
| DE | 198 56 297 A1 | 6/2000 |

(Continued)

*Primary Examiner*—David D Le
(74) *Attorney, Agent, or Firm*—Davis & Bujold, P.L.L.C.

(57) ABSTRACT

A valve assembly for controlling actuation of at least one starting clutch of an automatic transmission includes at least one clutch control valve through which a supply pressure is directed to a clutch actuation device, a pressure control valve controlled by a control device to supply at least one control valve of the valve assembly with a pilot pressure, a self-maintained hydraulic unit to maintain operation of an engaged starting clutch upon failure of the control device and loss of the pilot pressure. The valve assembly has a self-maintained valve and an activation valve. The self-maintained valve directs an activation pressure or control pressure, depending on the engine or transmission speed, to the activation valve. The actuation valve directs the activation to at least one clutch-regulating valve. The valve assembly also controls actuation or de-activation of the emergency operation function with a clutch actuation pressure.

16 Claims, 4 Drawing Sheets

FOREIGN PATENT DOCUMENTS

| | | |
|---|---|---|
| DE | 199 43 939 A1 | 3/2001 |
| DE | 102 38 104 A1 | 3/2004 |
| DE | 103 38 355 A1 | 3/2005 |
| DE | 10 2004 018 962 B3 | 10/2005 |
| DE | 10 2004 020 569 A1 | 12/2005 |
| EP | 0 487 128 A1 | 5/1992 |
| EP | 0 498 210 A1 | 8/1992 |
| EP | 0 982 512 A2 | 3/2000 |
| EP | 1 519 080 A1 | 3/2005 |
| EP | 1 522 754 A1 | 4/2005 |

* cited by examiner

CONTROL VALVE ASSEMBLY FOR CONTROLLING A STARTING CLUTCH OF AN AUTOMATIC TRANSMISSION

This application is a national stage completion of PCT/EP2006/009904 filed Oct. 13, 2006, which claims priority from German Application Serial No. 10 2005 050 493.0 filed Oct. 21, 2005.

FIELD OF THE INVENTION

The invention involves a control valve arrangement to control a start-up clutch of a automatic vehicle transmission.

BACKGROUND OF THE INVENTION

To activate a mechanical transmission emergency operation in an automatic transmission with an automated wet start-up clutch, possibly after a failure of a transmission control device, the flow of power into the transmission is stopped by bringing the start-up clutch into an disengaged condition with the power off. This strategy can result in critical conditions, especially during driving conditions in flowing traffic, because the vehicle without power can only coast.

Engaging the wet start-up clutch is also not possible in such a driving situation for technical safety reasons, since the frictional connection is only maintained by a hydraulic clutch activation pressure. Insofar as the vehicle drive motor stalls with a reduction of the vehicle speed and an engaged clutch, there remains only residual vehicle speed with which important secondary devices driven by the motor, like power brake units or power steering pumps, can no longer be sufficiently powered.

In automatic transmissions with a dry start-up clutch, this clutch is engaged to activate a mechanical dry-running operation so that the output of the vehicle remains connected, via the drive mechanism, with the motor until the vehicle stops. In the process, no critical driving conditions result, but after the vehicle comes to a stop, it cannot be moved anymore or pushed away.

Accordingly, there is need of a control device for a start-up clutch for an automatic vehicle transmission, which initially interrupts the flow of power in the drivetrain, depending on the engine speed and/or output rotational speed of the transmission, when a certain engine speed or transmission output rotational speed is exceeded so that the vehicle won't stall, the secondary devices remain powered and the driver still has the possibility of safely leaving a danger zone, if necessary. In addition, movement of the vehicle is also possible when at a standstill by way of such a control procedure, since the flow of power, between the motor and the transmission, is interrupted.

Against this background, a hydraulic emergency control for a continuously variable transmission is known from DE 199 43 939 A1 in which a clutch allocated to the transmission can be disengaged or engaged, depending on the rotational speed of the vehicle drive motor. As a result, in the event of a disturbance, stalling the drive motor can be avoided upon exceeding of a certain engine speed and starting is made possible upon exceeding a certain rotational speed. Depending on the design of the emergency control, the control signal which depends on the rotational speed can be generated and used as a hydraulic pressure, a pneumatic pressure or an electrical voltage.

In addition, a procedure to control an emergency shifting program for an automatic transmission with a start-up clutch is known from DE 102 38 104 A1 which can be implemented in particular to realize an emergency operation even at standstill of the vehicle, as well as to prevent a reduction of the motor rotational speed below a stall threshold. It is anticipated with this procedure that the emergency shifting program is actuated by a signal dependent on the vehicle speed and/or the motor rotational speed, which can be processed by valve logic and causes frictional connection to the motor to be interrupted in a timely manner during motor braking in order to avoid stalling the vehicle motor.

From DE 103 38 355 A1 a double clutch transmission is also known, which incorporates a first and a second clutch, where for normal operation, a first hydraulic power unit controlled by electronics is available to engage/disengage the first clutch and a second one to engage/disengage the second clutch. Furthermore, a status-maintaining, hydraulic power unit is provided which receives status signals corresponding to the current shift condition of the first and second clutch, via a first and a second hydraulic line, and that are connected via hydraulic control lines with the first and second hydraulic power unit. In the event of a failure of the electronics, the status-maintaining, hydraulic power unit actuates the first and second hydraulic power unit such that, at least in many shift conditions of the two clutches, the shift condition of the clutches, which was present immediately before the failure of the electronics, can be maintained.

Finally, a control valve arrangement to control the start-up clutch of an automatic transmission is known from DE 102 004 020 569.8, which was previously unpublished as of the filing date of this patent application, with which the start-up clutch can be disengaged in a simple, cheap-to-produce and reliable manner during an emergency control situation, when the motor rotational speed and/or power output of the transmission or the driving speed of the vehicle falls below a predetermined value.

The control valve arrangement includes a clutch-regulating valve to control at least a clutch activation device which, during normal operation of the transmission, converts a supply pressure previously furnished into a clutch activation pressure to control a clutch activation device depending on a pilot pressure or an electric pilot signal. The control valve arrangement is also characterized by an activation pressure, dependent on the motor rotational speed and/or transmission output rotational speed, being sent to the clutch-regulating valve or directly to the clutch activation device to achieve an emergency operation of the transmission in the event of the absence of the pilot pressure or the electric pilot signal, where it is held in the engaged position until the named rotational speed rises above the predetermined rotational speed boundary value.

Through this valve arrangement, a cheap to produce and reliably operated control device for emergency driving operation of a vehicle with an automatic transmission is created which is then activated when an electronic transmission control device and/or an electrically operated clutch-regulating valve fails. In this connection, the control pressure, dependent on the rotational speed of the vehicle drive motor and/or the transmission output rotational speed, ensures that the start-up clutch of the automatic transmission, remains engaged for torque transfer by the transmission so long as the vehicle speed and thus the rotational speed of the drive motor does not fall below a stall rotational speed at which the drive motor would cease its combustion engine operation.

Insofar as the vehicle speed is actually reduced during such emergency drive to the extent that stalling of the motor should be expected with an engaged start-up clutch, the known control valve arrangement opens such that the pilot pressure coupled to the control pressure the start-up clutch which, up until then, was transferring torque. A stalling of the motor is thereby advantageously avoided so that important vehicle secondary devices, like a power brake unit or power steering, can continue to operate without problems.

The invention has the basic task of proposing a control valve arrangement of the type named with a different construction with which a hydraulic emergency operation of the automatic transmission is activated and can be maintained when, during the failure of an electronic control device, a predetermined pilot pressure for the valves of the control valve arrangement is absent and a control pressure, dependent on motor or output rotational speed, is sufficiently high.

SUMMARY OF THE INVENTION

Accordingly, the invention proceeds from a control valve arrangement for activation control of at least a start-up clutch of a automatic vehicle transmission with at least one clutch-regulating valve, across which a supply pressure can be sent as a clutch activation pressure to a pressure chamber of an associated clutch activation device, with a pressure regulating valve, which is controlled by an electronic control device, and by at least a control valve of the control valve device being supplied with a pilot pressure P_VST3 and with a self-maintaining hydraulic power unit, with whose help a hydraulic emergency operation can be sustained, at least in many operating situations with an engaged start-up clutch during the failure of an electronic control device and consequently an absence of a pilot pressure P_VST3.

In order to solve the technical problems described, it is provided with the control valve arrangement of the invention that the self-maintaining hydraulic power unit for realization of an emergency operation function includes a self-maintaining valve and an activation valve; that the self-maintaining valve is constructed so that it is suited for transmitting an activation pressure, which depends on a motor revolution or transmission output revolution dependent control pressure to the activation valve; that the activation valve is suited for transmitting the activation pressure to at least a clutch-regulating valve, and that the control valve arrangement incorporates a way with which the activation or de-activation of the emergency operation function can be controlled by the clutch activation pressure.

Therefore, during the failure of an allocated electronic control device or the absence of a pilot pressure, the control valve arrangement activates and deactivates a hydraulic emergency operation type of the vehicle depending on the size of the rotational speed-dependent, control pressure and the clutch activation pressure on hand before the named failure.

In a control valve arrangement for a motor vehicle with only one start-up clutch, one clutch-regulating valve and one clutch activation device, this control valve arrangement is constructed so that the most recently existing shifting state of the clutch activation device is maintained with a sufficiently high rotation-dependent, control pressure of an electronic control device before the failure or the absence of a pilot pressure.

A control valve arrangement for a double clutch transmission with two start-up clutches, with two clutch-regulating valves and two clutch activation devices, is constructed such that with a sufficiently high rotation-dependent, control pressure and the failure of an electronic control device or the absence of a pilot pressure, a certain clutch activation device for both clutch activation devices is engaged or remains engaged when one of the two clutch activation devices is engaged before the named failure or engages with slippage. As a result, one of the two partial transmissions is especially designed for the described emergency operation so that, in particular, the transformation ratios present there can be used for the emergency operation.

In another embodiment of the control valve arrangement, according to the invention, with two clutch-regulating valves and two clutch activation devices provided for a double clutch transmission, this is constructed such that with a sufficiently high rotation-dependent, control pressure and a failure of the electronic control device and the absence of a pilot pressure, that particular clutch activation device of the two clutch activation devices remains engaged which was engaged before the named failure or was operated with slippage.

By way of such construction, an interruption of a tractive force was advantageously avoided which, in the previous embodiments possibly arose with a change of the torque-transferring partial transmission, if before the start of emergency operation, the low prioritized clutch activation device was activated and during emergency operation, the higher priority clutch activation device should have been activated in a clutch-locking manner.

Regardless of the described embodiments of the control valve arrangement, the concrete manner of construction can provide that the clutch activation pressure is led across a line to a pressure chamber of the activation valve and from there across a line to a pressure chamber of a self-maintaining valve, and that the clutch activation pressure can be guided from the latter pressure chamber across a line to a pressure chamber on the end of the self-maintaining valve away from the resetting spring. By way of this construction, a feedback-coupling of the clutch activation pressure across the activation valve to the self-maintaining valve is achieved.

In addition, such a control valve arrangement can provide that the pressure chamber on the activation valve accepting the clutch activation pressure can then be blocked by a center control piston of a control valve of the activation valve, if the pilot pressure characterizing normal operation is present in the pressure chamber of the activation valve away from the resetting spring.

Further characteristics of a control valve arrangement, according to the invention, are that the activation pressure from the self-maintaining valve can flow through a line to the activation valve and from there through a line to a pressure chamber on the end of the clutch-regulating valve away from the resetting spring, if the pilot pressure is absent from the activation valve and the clutch activation pressure is so high that it can bias the control valve of the activation valve, against the force of its resetting spring, to such an extent that a control piston of the self-maintaining valve releases a conveyance connection between two pressure chambers on the self-maintaining valve.

Such a control valve arrangement can also be characterized in that the self-maintaining valve is constructed such that, if the pilot pressure is absent at the activation valve and the clutch activation pressure is sufficiently high, then the rotational speed-dependent, control pressure on the control valve of the self-maintaining valve can act against the force of its resetting spring. Through this construction moving the control valve of the self-maintaining valve axially so far with the assistance of a sufficiently high clutch activation pressure such that the rotational speed-dependent, control pressure, likewise, acts axially on its control valve succeeds. As long as the rotational speed-dependent, control pressure is high enough, then the self-maintaining valve is held by this control pressure in a position which facilitates emergency hydraulic operation.

In order to further develop the last named control valve arrangement for the described manner of functioning, it is provided that a clutch-regulating valve incorporates a short control valve and a long control valve where, during emergency operation, the activation pressure on the short control valve can be transmitted in such a manner that the short control valve then acts on the long control valve.

A concrete embodiment of a control valve arrangement for a transmission with two start-up clutches includes two clutch-regulating valves and two clutch activation devices of which only the first clutch regulating device is acted upon with an activation pressure from the activation valve and where, during normal operation, two different pilot pressures act on the two clutch-regulating valves with the help of which the actual clutch activation pressure from a supply pressure, which is fed to the two clutch regulation valves, can be adjusted for the two clutch activation devices and where the higher clutch activation pressure can be directed, via a twin pressure valve, across an activation valve to the pressure chamber away from the resetting spring.

To perform the hydraulic emergency operation with this control valve arrangement, the only clutch-regulating valve used is the one acted upon by the activation pressure which can supply the associated and thus higher prioritized clutch activation device with a clutch activation pressure engaging the start-up clutch.

In order to construct the last named control valve arrangement for the described manner of functioning, it is provided that one of the two clutch-regulating valves includes a short control valve and a long control valve where, during emergency operation, the activation pressure is supplied to the short control valve which then acts on the long control valve with an axial activation force. The second clutch-regulating valve only has a long control valve and is not acted upon by the activation pressure.

It can also be seen in a further development of the control valve arrangement that both clutch-regulating valves incorporate a short control valve and a long control valve where, during emergency operation, the activation pressure is supplied to the short control valve of that clutch-regulating valve with which a start-up clutch was engaged or held with slippage via the associated clutch activation device. Then the short control valve acts in the manner described on the long control valve of the clutch-regulating valve in question.

According to another embodiment of the last named control valve arrangement for a double clutch transmission, the latter has a clutch selector valve with which, upon activation of the emergency operation function, the clutch activation device last active in the engaging direction activates the associated engaged or held with slippage clutch and the activation pressure is supplied to the clutch-regulating valve in question.

It is advantageous if the clutch selector valve is constructed as a pressure compensator in which the clutch activation pressure for the second clutch activation device is supplied to two pressure chambers at the axial ends of the clutch selector valve, where these two pressure chambers are axially bounded by a large diameter control piston or a small diameter control piston and where a third control piston axially connects directly to the small diameter control piston whose free marginal end face, compared to the control piston with the smaller diameter, can be acted upon in a pressure chamber by the clutch activation pressure of the first clutch activation device 4 and where the end face of the third control piston facing the large diameter control piston, as well as the end face of the larger diameter control piston facing the third control piston, are acted upon with the activation pressure in the associated pressure chambers and where the activation pressure can be sent, depending on the position of the control valve of the clutch selector valve, to a pressure chamber of the first clutch-regulating valve away from the resetting spring or to a pressure chamber of the second clutch-regulating valve away from the resetting spring.

This clutch selector valve preferably includes a spring-loaded locking device with the help of which a shift position can be securely assumed in the event of pressure variations or rapid shifting processes.

Finally, it is provided that in the area of the free end of a long control valve of the clutch-regulating valve, a pressure chamber can be acted upon with a pilot pressure with which, after de-activation of the rotational speed-dependent, self-maintaining function of the self-maintaining valve, the control valve can be displaced against the reset force of the resetting spring acting on this control valve such that a supply pressure, guided to the clutch-regulating valve as a clutch-regulating pressure, is again passed further on to the clutch activation device.

It should also be noted here that with regard to the further transmission of the activation pressure to at least one clutch-regulating valve, the control valve arrangement can be constructed differently, but have the same effect. Contrary to the described embodiment, however, it can also be provided that the activation pressure is first directed to the activation valve and from there to the self-maintaining valve and the to at least one clutch-regulating valve.

BRIEF DESCRIPTION OF THE DRAWINGS

The invention will now be described, by way of example, with reference to the accompanying drawings in which.

DETAILED DESCRIPTION OF THE INVENTION

Figure 1:
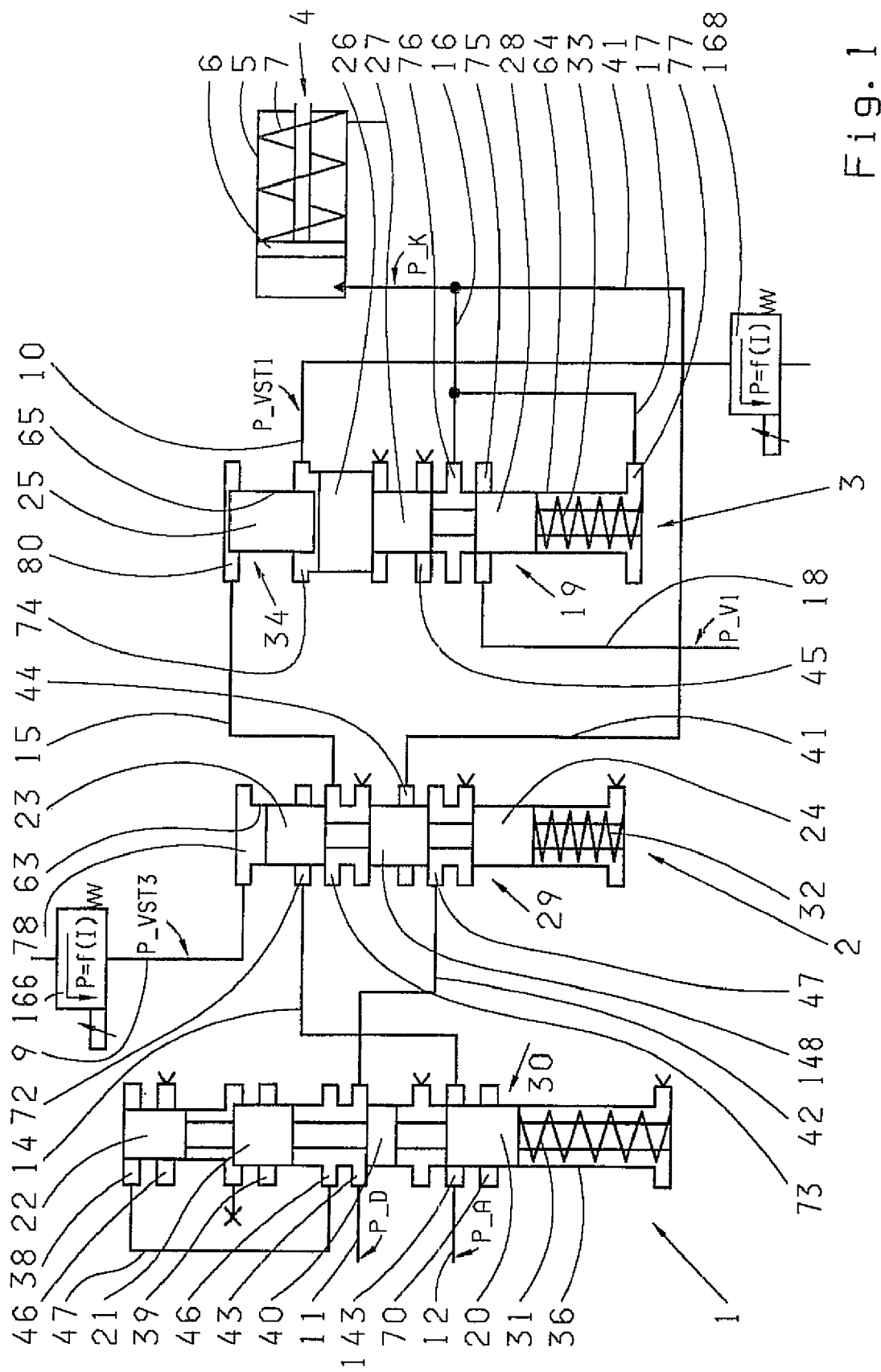
FIG. 1 is a control valve device according to the invention with a self-maintaining hydraulic unit for a clutch activation device.

The control valve arrangement, depicted in FIG. 1, includes a self-maintaining valve 1, an emergency operation activation valve 2 (hereinafter called an activation valve), a clutch-regulating valve 3, as well as a clutch activation device 4. The clutch activation device 4 has a cylinder 5 in which a piston 6 is displaced in the area of its piston rod by a resetting spring 7 wound co-axially and acting against a clutch activation pressure P_K and is biased into an engaged position by the force of pressure on its end face opposite the spring, such that the start-up clutch of an automatic transmission is engaged for torque transfer.

The start-up clutch (not depicted here but known to then experts) belongs to an automatic transmission which can be constructed as a conventional stepped automatic transmission on the basis of a planetary gear transmission, a transmission continuously changing its translation relationships or as a power shift, standard transmission. In the event that the control valve arrangement is to be constructed for a double clutch transmission, two clutch-regulating valves, as well as two clutch activation devices are used, as seen in conjunction with FIGS. 3 and 4.

The named valves 1, 2 and 3 are placed in a slide-valve gearbox of an electro-hydraulic control device for the transmission (not shown) controlled by an electronic control device where each valve includes at least one control valve which axially biases pressure chambers to be opened, connected and/or closed by hydraulic pressure and/or spring setting forces.

The self-maintaining valve 1 has a control valve 30, which is positioned in a borehole of a valve 36 and is displaced axially. The control valve 30 has four control pistons 20, 21, 22 and 40 which are distanced from each other, where a face of the control piston 20 is acted upon by a resetting spring 31 with its reset force. In addition, a control pressure P_D is introduced via a line 11 into a pressure chamber 39 of the self-maintaining valve 1 blocked by the control piston 21, the height of which pressure depends on the rotational speed count of the vehicle drive motor or the transmission output rotational speed.

In addition, an activation pressure P_A is introduced across a line 12 into a pressure chamber 70 of the self-maintaining valve 1 blocked by the control piston 20, which pressure ensures, during emergency operation of the transmission after a failure of the electronic control device, that the torque-transferring, start-up clutch of the transmission remains engaged because of the engaging action of the clutch activation device 4 for as long as the rotational speed-dependent, control pressure remains high enough. A pressure boundary for it depends on the stall rotational speed of the vehicle drive motor.

Regarding the construction of the activation valve 2, it should be noted that its control valve 29 incorporates three separated control pistons 23, 148 and 24 which are positioned in a bored hole 63 of the previously mentioned slide-valve gearbox so as to be axially movable. In the process, a face of the control piston 24 is acted upon by the force of a resetting spring 32.

The activation valve 2 is axially acted on during normal operation by a pilot pressure P_VST3, which is made available by a pressure-regulating valve 166 controlled by an electronic control device from the main pressure of the hydraulic control unit. This pilot pressure P_VST3 was directed through line 9 to a pressure chamber 78 of the activation valve 2 opposite the resetting spring, where it acts on the front face of the control piston 23 of the control valve 29 of the activation valve 2.

A line 14 also connects a pressure chamber 70 and 143 of the self-maintaining valve 1 with a pressure chamber 72 of the activation valve 2, whereby this pressure chamber 72 is closed by way of the control piston 23 away from the resetting spring or in the absence of the pilot pressure P_VST3 is hydraulically connected with a pressure chamber 73 at the activation valve 2.

Using the middle control piston 148 of the control valve 29 of the activation valve 2, a connection between lines 41 and 42 between the pressure chamber of the clutch activation device 4 and a pressure chamber 43 on the self-maintaining valve 1 can be interrupted or opened.

The clutch-regulating valve 3 includes an axially longer control valve 19 with three control pistons 26, 27 and 28, as well as an axially shorter control valve 34 which can be axially accepted into bored holes 64 and 65 of the named slide-valve gearbox. The axially longer control valve 19 is thereby acted upon on the end of the control piston 28 by a resetting spring 33 with a resetting force.

The axially shorter control valve 34 includes a control piston 25 whose face closest the other control valve 19 and located in a pressure chamber 74 can be acted upon by a pilot pressure, P_VST1. The pilot pressure P_VST1 is regulated by a pressure regulating valve 168 from the main pressure of a pressurized means produced by an oil pump (not shown), and is directed to the pressure chamber 74 via a line 10. The pressure regulating valve 168 is controlled by a control device (not shown), preferably a transmission control device. The activation pressure P_A can be directed to the opposite front face of piston 25, via a line 15 in pressure chamber 80, which is connected with pressure chamber 73 on the activation valve 2.

The axially longer control valve 19 of the clutch-regulating valve 3 incorporates the three named control pistons 26, 27 and 28 of which the two pistons 26 and 27 further far from the resetting-spring are arranged axially, directly adjacent to each other. The free face of control piston 26, opposite the axially shorter control valve 34, can also be acted upon with the named pilot pressure P_VST1 across pressure chamber 74, while the face of the control piston 28 opposite the resetting spring is associated with pressure chamber 75 into which a system or supply pressure P_V1 can be introduced across a line 18.

During normal operation, this pressure chamber 75 can be connected by way of appropriate actuation of the clutch-regulating valve 3, via the pilot pressure P_VST1 with an axially adjacent pressure chamber 76 so that a regulated clutch activation pressure P_K, regulated by the control piston 28, can act in this pressure chamber 76. Pressure chamber 76 can also be connected via a line 16 with the cylinder 5 of the clutch activation device 4, as well as via a line 17 with a pressure chamber 77 at the clutch-regulating valve 3 which also accepts its resetting spring 33.

A manner of functioning of the control valve arrangement, according to FIG. 1 is as follows:

During normal driving operations the control valve 30 of the self-maintaining valve 1 is brought to its basic position by the force of the resetting spring 31, where pressure chambers 38, 70 and 143 are closed. In addition, the pilot pressure P_VST3 acts in the pressure chamber 78 of the activation valve 2 in such a way that its control valve 29 is positioned against the resetting force of the resetting spring 32 and displaced so far axially into borehole 63 that pressure chamber 72 is separated from pressure chamber 73 by control piston 23. A further transmission of the activation pressure P_A from the activation valve 2 across line 15 to the clutch-regulating valve 3 is impossible.

In addition, the axially longer control valve 19 of the clutch-regulating valve 3 is acted upon by the pilot pressure P_VST1 across line 10 in such a way that the control edge of the control piston 28 more or less releases the pressure chamber 75 at the clutch-regulating valve 3. In this way, depending on the level of the pilot pressure P_VST1, the supply pressure P_V1 can be regulated in relation to a clutch activation pressure P_K with which the clutch activation device 4 can be brought to a position disengaging, slipping or engaging the associated clutch.

Moreover, it can be seen in FIG. 1 that the face of the control piston 28 of the clutch-regulating valve 3 facing the resetting spring 33 is acted upon through pressure chamber 76, as well as lines 16 and 17, with the regulated clutch activation pressure P_K.

Finally, FIG. 1 shows that line 16 directing the clutch activation pressure P_K is connected with line 41, leading to a pressure chamber 44 of the activation valve 2. During normal operation, this pressure chamber 44 is blocked by control piston 148 so that the clutch activation pressure P_K is placed on self-maintaining valve 1 so as not to activate.

To the extent pilot pressures P_VST1 and P_VST3 are absent or are greatly reduced, due to a defect in the electronic control device or a failure of it or the pressure regulating valves, the control valves 19 and 29 move to their basic position so that the clutch activation device 4 would be cut off without any other measures from the supply pressure P_V1 and thus from the clutch activation pressure P_K. The pressure mediums with the last available clutch activation pressure P_K would then be guided through a pressure chamber 45 released by the control piston 27 into a pressure medium tank, and the clutch activation device 4 would then be free of any pressure.

By way of the construction of the control valve arrangement of the invention, shown in FIG. 1, the clutch activation pressure P_K flows through line 41, pressure chamber 44 of the activation valve 2, which is opened during an emergency operation situation, and line 42 to pressure chamber 43 of the self-maintaining valve 1. From there, the clutch activation pressure P_K flows through an adjacent pressure chamber 46, as well as line 47 into the pressure chamber 38 of the self-maintaining valve 1 opposite the resetting spring and there acts on the free front face of the control piston 22.

At the time of the failure of the electronic control device, due to an engaged or slipping clutch, if only the clutch activation pressure P_K is still high enough, then the control valve 30 is biased by the clutch activation pressure P_K, which is present in pressure chamber 38 opposite the resetting spring, against the force of the resetting spring 31 such that the rotational speed-dependent, control pressure P_D in a pressure chamber 39 of the self-maintaining valve 1 presses the front face of control piston 21 opposite the resetting spring.

In so far as the rotational speed dependent control pressure P_D is high enough for the activation and maintaining of a hydraulic emergency operation, then control valve 30 remains in position in which the pressure medium with the activation pressure P_A flows from line 12 through the pressure chambers 70 and 143 of the self-maintaining valve 1, then line 14 and the pressure chambers 72 and 73 of the activation valve 2, as well as line 15 to the pressure chamber 80 of the clutch activation valve 3 opposite the resetting spring. As a result, the short control valve 34 of clutch activation valve 3 presses axially against the force of the resetting spring 33 on the long control valve 19 so that finally its control piston 28 opens pressure chambers 75 and the pressure mediums, at pressures P_V1 and P_K, flow into the pressure chamber of the clutch activation device 4.

Additionally in this situation, the control piston 21 of the self-maintaining valve 1 separates its pressure chamber 46 from pressure chamber 43 so that the clutch activation pressure P_K is prevented from flowing into the pressure chamber 38 of the self-maintaining valve 1 opposite the resetting spring. There is also the result that piston 22 of the control valve 30 of the self-maintaining valve 1 has moved in the direction toward resetting spring 31 and that pressure chamber 38 communicated with pressure chamber 46 through which the enclosed pressure mediums can be directed into the pressure medium tank with the last clutch activation pressure P_K.

As soon as the rotational speed-dependent, control pressure P_D has fallen such that it can no longer maintain the control valve 30 in the described position, it moves back to its basic position so that further flow of the activation pressure P_A to the activation valve 2 and from there to the clutch-regulating valve 3, is interrupted. As a consequence of this, the short and long control valves 34 and 19 move back to their basic position, such that the control piston 28 prevents the pressure chamber 75 directing the supply pressure P_V1, as well as the control piston 27 releases the pressure chamber 45 which can be emptied to release pressure from the pressure chamber of the clutch activation device 4. As a result, the emergency operation phase ends with a now-disengaged, start-up clutch.

As can be seen in FIG. 1, with an increase of the rotational speed-dependent, control pressure P_D after an emergency operation without application of a pilot pressure P_VST1 and P_VST3, the clutch activation device 4 cannot then be biased to its engaged position so that a safety technical advantage is achieved in that a vehicle with a disengaged start-up clutch can be towed without the rotational speed-dependent, control pressure P_D possibly flowing into line 11 by rolling of the vehicle wheels and resulting in engagement of the start-up clutch.

Figure 2:
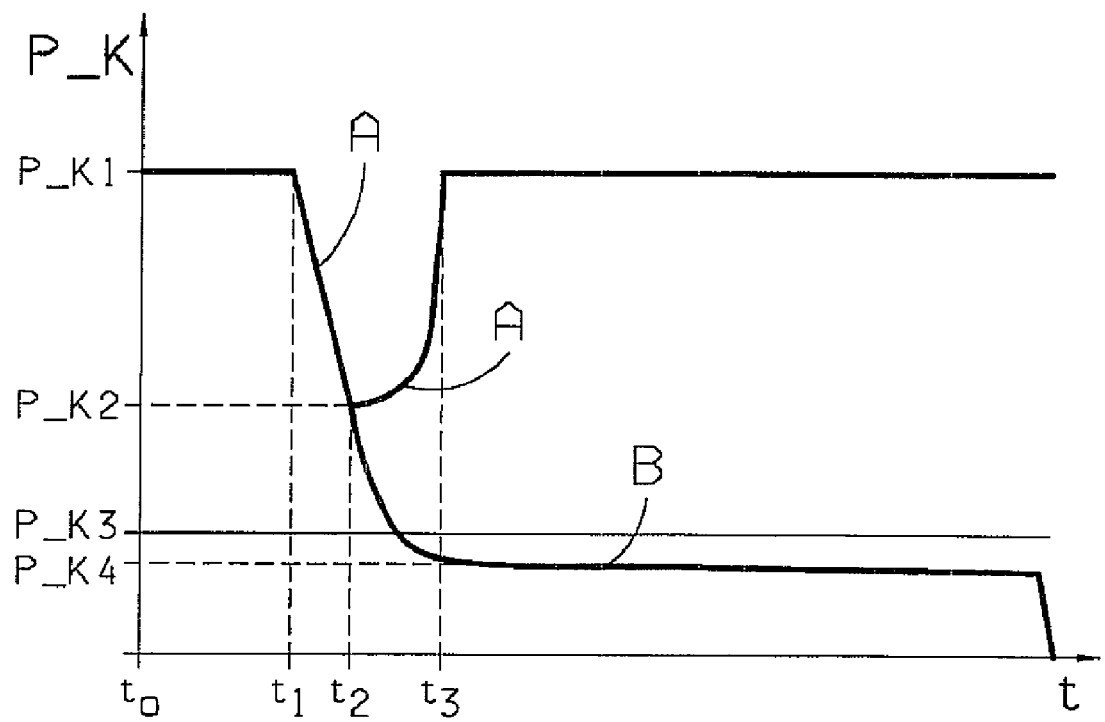
FIG. 2 is a diagram showing the clutch activation pressure for the clutch activation device according to FIG. 1.

To further clarify the manner of functioning of the control valve arrangement according to FIG. 1, FIG. 2 shows the clutch activation pressure P_K for activating the clutch activation device 4 over the course of time. Starting at a point in time $t_0$, a clutch activation pressure P_K1 is present in the pressure chamber of the clutch activation device 4 which holds the associated start-up clutch engaged. At a point in time $t_1$, the electronic control device for this control valve arrangement fails or the pilot pressures P_VST1 and P_VST3 fall below a predetermined expected pressure for some other undesired reason.

In an initial assumed control function, according to the curve A-A, the rotation speed-dependent, control pressure P_D is higher than the predetermined pressure boundary value. This means that either the rotational speed of the vehicle motor lies above the stall rotational speed or that the transmission output rotational speed, also the vehicle speed, is at a value which lies above the predetermined boundary value.

Since the pilot pressure P_VST1 no longer acts on the clutch-regulating valve 3 in this operational situation, its spring biased control valve 19 moves to its basic position, whereupon the introduction of the supply pressure P_V1, through the clutch-regulating valve 3 to the clutch activation device 4, is interrupted. For this reason, a return of the clutch activation pressure to the value P_K2 must be determined during the switching time period $t_1$ to $t_2$ of the self-maintaining valve 1. Since with the start of the pressure drop after the point in time $t_1$, the emergency holding function of the control valve arrangement is so initiated, that the clutch activation pressure P_K sent across the activation valve 2 to the self-maintaining valve 1 is higher than the boundary clutch activation pressure P_K3; the control valve 30 of the self-maintaining valve 1 is pushed by way of the clutch activation pressure P_K against the force of its resetting spring 31.

Because the rotational speed-dependent, control pressure P_D in the time period $t_1$ to $t_2$ is high enough, the activation pressure P_A moves to the clutch activation valve 3 so that, after the point in time $t_2$, the activation pressure P_K again increases. The output value P_K1 is attained at a point in time $t_3$ such that the start-up clutch remains engaged in the emergency operation situation until the rotational speed-dependent, control pressure P_D falls below the predetermined pressure limit value.

In a second assumed control function whose clutch activation pressure course A-B is shown in FIG. 2, the rotational speed-dependent, control pressure P_D is lower than the predetermined pressure limit value for the same. This means that either the rotational speed of the vehicle motor lies below its stall rotational speed or that the transmission output, rotational speed is at a value which lies below a predetermined boundary value. In this operational case, the rotational speed-dependent, control pressure P_D is not sufficient to hold the control valve 30 against the force of its resetting spring 31.

Because of the further dropping clutch activation pressure P_K, the control valve 30 of the self-maintaining valve 1 is again pushed back by the resetting spring 31 into its basic position, so that the activation pressure P_A can no longer flow through the activation valve 2 to the clutch-regulating valve 3. The self-maintaining function of the control valve arrangement, according to FIG. 1, is thus de-activated at the latest at point in time $t_3$ and at a clutch activation pressure P_K4, which then further falls with a disengaged start-up clutch.

Figure 3:
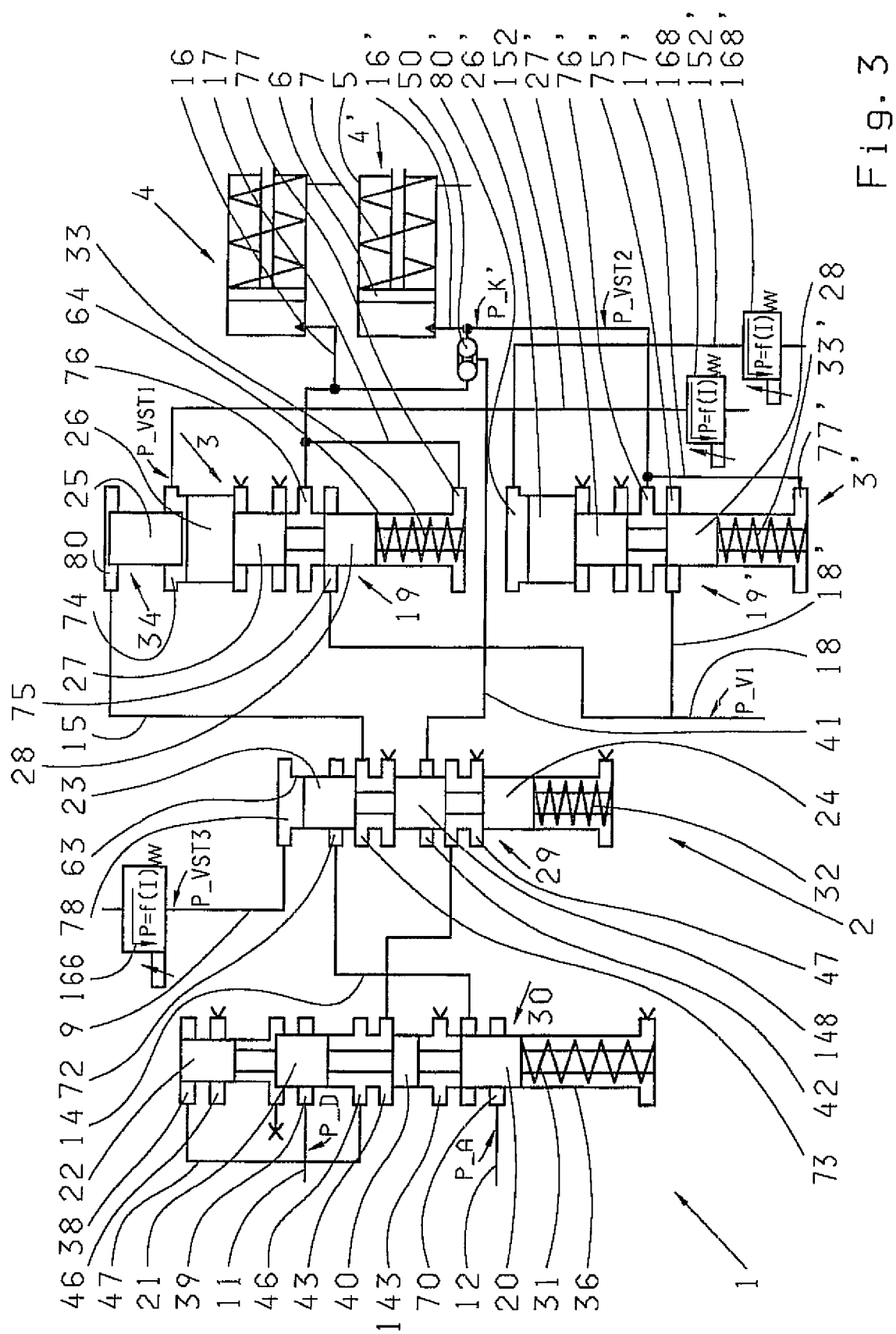
FIG. 3 is a control valve arrangement, similar to FIG. 1, but with two clutch regulating-valves for two clutch activation devices.

The control valve arrangement, shown in FIG. 3, is provided to activate two clutch activation devices 4 and 4' with which two start-up clutches (not shown) of a double clutch transmission can be activated by way of clutch activation pressures P_K and P_K'. Contrary to the control valve arrangement of FIG. 1, the self-maintaining valve 1 and the activation valve 2 selectively control two clutch activation valves 3 and 3' such that the higher priority start-up clutch of both partial transmissions of the double clutch transmission can be held engaged or is engaged, even during the described emergency operation situation, when the pilot pressures P_VST3, P_VST1 and P_VST2 are absent, as well as when the rotational speed-dependent, control pressure P_D is sufficiently high.

In the embodiment shown in FIG. 3, the start-up clutch, activated by the clutch activation device 4, is the higher priority, start-up device which primarily means that the first clutch-regulating valve 3 includes a short control valve 34 with which this clutch-regulating valve 3 can be activated by the supplied activation pressure P_A even during emergency operations. The second clutch-regulating valve 3' for the second clutch activation device 4' does not include such a short control valve 34. Because of this construction, the first of the two partial transmissions is able to be used especially for emergency operations, such that transmission gears that are especially suitable are constantly available.

Of special significance in the control valve arrangement, according to FIG. 3, is a two-way valve 50 which directs the higher clutch activation pressure P_K or P_K' of one of the two clutch activation devices 4, 4', in the manner described, through the activation valve 2 to the self-maintaining valve 1.

The special construction and the special manner of action of the control valve arrangement, according to FIG. 3 is explained in more detail below.

During normal operation of a vehicle with a double clutch transmission which will be looked at next, the first start-up clutch is engaged, while the second start-up clutch is disengaged. To do that, the pilot pressure P_VST1, regulated by the pressure regulating valve 168, is present in pressure chamber 74 of the first clutch-regulating valve 3 to bias its control valve 19 against the force of the resetting spring 33 such that the supply pressure P_V1 is regulated by the position of the control piston 28 to such a high clutch activation pressure P_K that the first clutch activation device 4 holds the first start-up clutch engaged.

In this situation, a pressure regulating valve 168' is controlled by the electronic control device such that no or only a slight pilot pressure P_VST2 flows to a pressure chamber 80' of the second clutch-regulating valve 3'. As a result, its control valve 19' is in the basic position thus preventing pressure mediums below the supply pressure P_V1 from flowing from a line 18' and a pressure chamber 75' of the second clutch-regulating valve 3' into a line 16' leading to the pressure chamber of the second clutch activation device 4'. The second start-up clutch is therefore disengaged.

The previously mentioned two-way valve 50 is positioned between the two lines 16 and 16' and has an outlet connected with line 41 which, as previously described, leads to the pressure chamber 44 of the activation valve 2. The two-way valve 50 in this embodiment is constructed such that it always only allows the flow of the higher clutch activation pressure P_K or P_K'. In the operational case viewed here, this is the clutch activation pressure P_K for the first clutch activation device 4. During normal operation this clutch activation pressure P_K does not flow from the activation valve 2 with the pilot pressure P_VST3 adjacent to the activation valve 1.

In the event of the failure of the electronic control device and the absence of the pilot pressure P_VST3, the clutch activation pressure P_K first flows in the manner explained in conjunction with FIG. 1 through the activation valve 2 into the pressure chamber 38 opposite the resetting spring of the self-maintaining valve 1, where it axially displaces its control valve 30 so much that the rotational speed-dependent, control pressure P_D in the pressure chamber 39 can axially act on the control piston 21 of the self-maintaining valve 1. In so far as the rotational speed-dependent, control pressure P_D is high enough, the control valve 30 of the self-maintaining valve 1 is held in its position so that the activation pressure P_A flows through line 14, the pressure chambers 72 and 73 of the activation valve 2, the line 15 and into the pressure chamber 80 of the first clutch-regulating valve 3. As a result, its small control valve 34 presses on the large control valve 19 in such a way that the control piston 28 opens pressure chamber 75 to pressure chamber 76, such that the supply pressure P_V1 can flow as a clutch activation pressure P_K through line 16 and into the pressure chamber of the first clutch activation device 3. Accordingly, the first clutch activation device 4 remains in the engaged position and the second clutch activation device 4' of the second start-up clutch has no pressure.

In that state of operations in which the second partial transmission of the double clutch transmission is actively integrated by an engaged, second start-up clutch before the failure of the electronic control device in the drivetrain, the pilot pressure P_VST2, regulated by the pressure regulating valve 168' and supplied via a line 152' into the pressure chamber 80' of the second clutch-regulating valve 3', is shifted such that its sole control valve 19' has been axially biased against the force of a resetting spring 33' such that the supply pressure P_V1 flows through line 18', pressure chambers 75' and 76', and line 16' as a clutch activation pressure P_K' into the pressure chamber of the second clutch activation device 4' and thus holds the second start-up clutch engaged.

It should also be mentioned at this point that, according to FIG. 3, the clutch activation pressure P_K, P_K' flows through lines 17, 17' into pressure chamber 77, 77' on the spring resetting side of each clutch activation valve 3, 3' so that the clutch activation pressure P_K, P_K' can be well regulated.

In the event of the failure of the electronic control activation device and the absence of the pilot pressures P_VST1, P_VST2 and P_VST3, the clutch activation pressure P_K' for the second clutch activation valve 4' flows through the two-way valve 50, line 41; the pressure chambers 44 and 47 of the activation valve 3, line 42; the pressure chambers 43 and 46, and line 47, into the pressure chamber 38 opposite the resetting spring of the self-maintaining valve 1. As a result, the control valve 30 is also axially displaced such that the rotational speed-dependent, control pressure P_D can move into pressure chamber 39 so as to be able to activate.

As long as this rotational speed-dependent, control pressure P_D is sufficiently high, in order to hold the control valve 30 in its position, the activation pressure P_A moves, in the manner already described through the self-maintaining valve 1 and the activation valve 2 to the pressure chamber 80 of the first clutch-regulating valve 3, where finally its large control valve 19 is axially biased such that the supply pressure P_V1 flows as a clutch activation pressure P_K to the first clutch activation device 4 and engages the first start-up clutch.

During the further temporal course, the clutch activation pressure P_K' at the second clutch activation device 4' drops, since because of the absence of the pilot pressure P_VST2, the second clutch-regulating valve 3' produces no more clutch activation pressure P_K'. As soon as the clutch activation pressure P_K is higher than the clutch activation pressure P_K', the two-way valve 50 reverses so that then the clutch activation pressure P_K flows to the pressure chamber 43 of the self-maintaining valve 1 which was closed by control piston 21.

Figure 4:
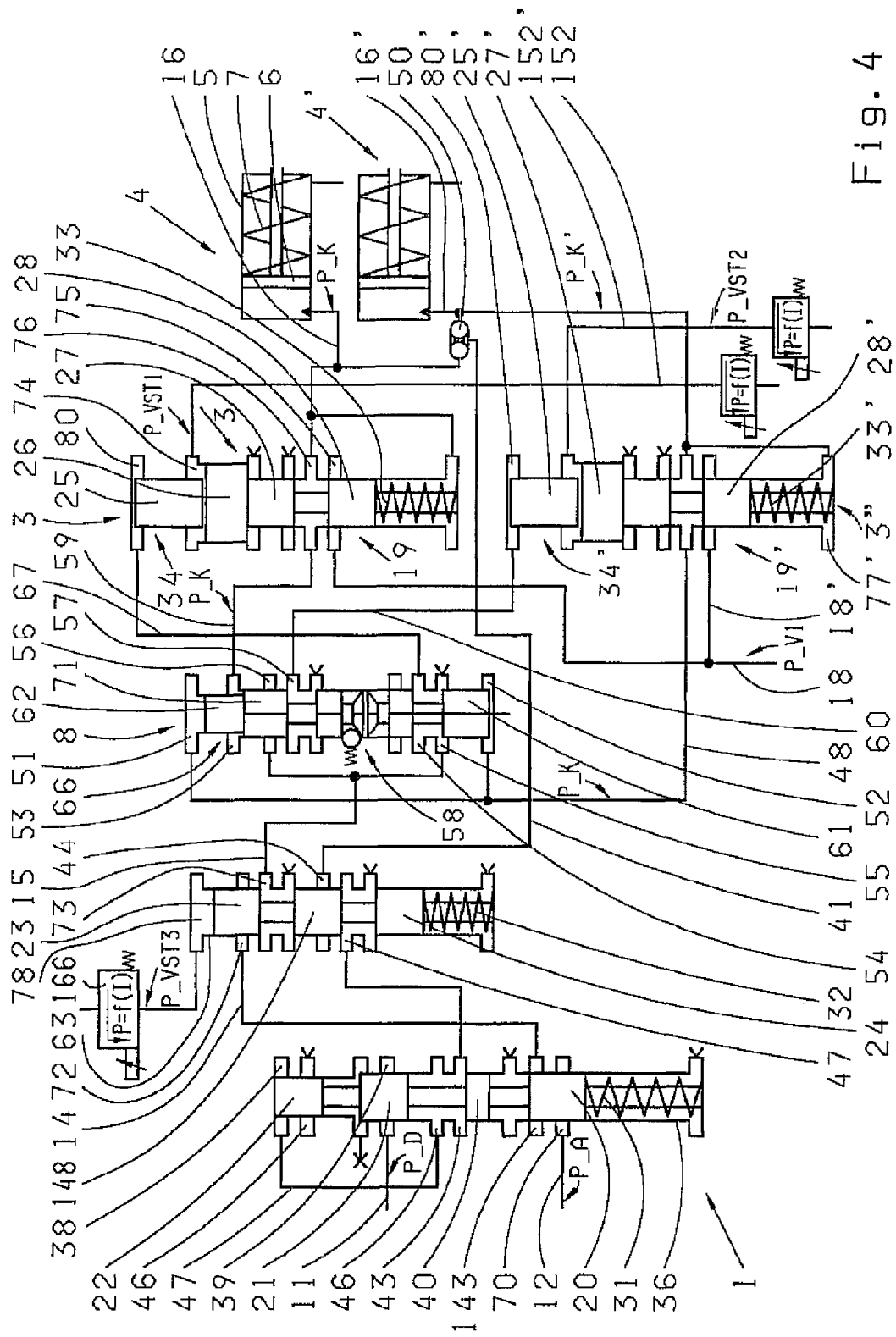
FIG. 4 is a control valve arrangement, similar to FIG. 3, but also with a clutch selector valve.

The last embodiment of the control valve arrangement, according to the invention, is shown in FIG. 4. In comparison to the control valve arrangement of FIG. 3, this is also constructed for alternate activation of both clutch activation devices 4 and 4' of both start-up clutches of a double clutch transmission, but its construction is such that the last engaged start-up clutch is held engaged for the frequently described emergency operation or is engaged at the conclusion of the slippage operation.

In addition, the control valve arrangement, according to FIG. 4, includes two identical clutch-regulating valves 3 and 3" which, in the event of emergency operation, can be controlled by a clutch selector valve 8 so that the last engaged start-up clutch also remains engaged and is transferred from the slippage operation to the engaged position. To that end, the clutch selector valve 8 is constructed as a pressure balance; on whose pressure chambers 55, as well as 56, the activation pressure P_A can act with an opened self-maintaining valve 1 and an opened activation valve 2; on whose axially outer pressure chambers 51 and 52 the clutch activation pressure P_K' of the second clutch activation device 4' acts; on whose pressure chamber 53 the clutch activation pressure P_K of the first clutch activation device 4 acts.

Depending on the pressure conditions at this clutch selector valve 8, a control valve 66 of the clutch selector valve 8 is displaced such that, in an emergency operation situation, the activation pressure P_A is directed from a pressure chamber 54 of the clutch selector valve 8, through a line 67 and to the pressure chamber 80 of the first clutch-regulating valve 3, if the first start-up clutch was engaged or activated with slippage, before the absence of the pilot pressures P_VST1, P_VST2 and P_VST3. In so far as the second start-up clutch was engaged or activated with slippage, then the clutch selector valve 8 directs the activation pressure P_A from the pressure chamber 57 through a line 60 to the pressure chamber 80' of the second clutch-regulating valve 3' so that the second start-up clutch remains engaged or is transferred from a slippage operation to a engaged condition.

The manner of function will be explained in detail below for that operational case in which the first start-up clutch is slipping or engaged under normal operation. In this situation, the clutch activation pressure P_K is present in the pressure chamber of the cylinder 5 of the clutch activation device 4, while a supply of pressure to the pressure chamber of the second clutch activation device 4' is interrupted by the non-presence of the pilot pressure P_VST2 at a second clutch-regulating valve 3". Therefore, the two-way valve 50 directs the clutch activation pressure P_K further along through line 41 to the activation valve 2.

With an absence of the pilot pressure P_VST3 caused by a failure, the clutch activation pressure P_K is directed through the opened activation valve 2 to the pressure chamber 38 of the self-maintaining valve 1 opposite the resetting spring, whereupon its control valve 30 is displaced such that the rotational speed-dependent, control pressure P_D can act axially on the control piston 21 of the self-maintaining valve 1. In so far as this rotational speed-dependent, control pressure P_D is high enough and thus the motor rotational speed is higher than the stall rotational speed, the activation pressure P_A flows through the self-maintaining valve 1 and the opened activation valve 2 to pressure chambers 55 and 56 of the clutch selector or valve 8.

The lower clutch activation pressure P_K' of the second clutch activation valve 3", supplied via lines 48 and 49, to pressure chambers 51 and 52 of the clutch selector valve 8, with these two pressure chambers 51 and 52 constructed at opposite ends of the borehole of the clutch selector valve 8 in which the control valve 66 of this valve is arranged movably. The axial end of the control valve 66 has a control piston 61 on whose free face the pressure in pressure chamber 52 acts, while the pressure in pressure chamber 51 acts on the free face of an opposite control piston 62 of the control valve 66. Directly adjacent the control piston 62, in the control valve is a control piston 71 with a larger diameter than the former, and on whose free face, facing control piston 62, there acts the clutch activation pressure P_K, supplied to pressure chamber 53.

It should be pointed out with regard to the control piston 61 on the axially opposite side of the control valve 66 that, by when it is in one of its end positions, the pressure chamber 55 is so opened allowing a flow of pressure medium, between this pressure chamber 55 and pressure chamber 54, such that with an appropriate position of the control valve 58 the activation pressure P_A can further flow via line 67 to pressure chamber 80 of the first clutch-regulating valve 3.

In so far as the control valve 66 of the clutch selector valve 8 is located in the other end position, the connection between the two pressure chambers 54 and 55 is closed, while a pressure connection between pressure chambers 56 and 57 is opened by control piston 71. The activation pressure P_A moves from this pressure chamber 57, via line 60, to pressure chamber 80' of the second pressure regulating valve 3" to enable the supply pressure P_V1, as a clutch activation pressure P_K' to flow into the pressure chamber of the second clutch activation device 4'.

In addition, the clutch selector valve 8 is equipped with a locking device 58 including a spring-loaded ball to ensure that despite possible pressure fluctuations, definite activation and de-activation conditions are created for both clutch-regulating valves 3 and 3".

This clutch selector valve 8 operates, by way of the described basic construction, as well as the dimensioning of the areas of the control piston exposed to the pressure medium, as a pressure balance to such an extent that before the described failure, the clutch just engaged or retained in a slippage condition also remains engaged in an emergency operation or is brought to an engaged condition.

REFERENCE NUMERALS 1 self-maintaining valve
2 activation valve
3, 3', 3" clutch-regulating valve
4, 4' clutch regulating device
5, 5' cylinder
6, 6' clutch piston
7, 7' resetting spring
8 clutch selector valve
9 line pilot pressure P_VST3

10 line pilot pressure P_VST1
11 line rotational speed-dependent pressure P_D
12 line activation pressure P_A to the self-maintaining valve
14 line self-maintaining valve-activation valve
15 line activation valve-clutch-regulating valve
16, 16' line clutch-regulating valve-clutch activation device
17, 17' line clutch-regulating valve-clutch activation device
18, 18' line supply pressure
19, 19' control valve in clutch-regulating valve
20 control piston in self-maintaining valve
21 control piston in self-maintaining valve
22 control piston in self-maintaining valve
23 control piston in activation valve
24 control piston in activation valve
25, 25' control piston in clutch-regulating valve
26, 26' control piston in clutch-regulating valve
27, 27' control piston in clutch-regulating valve
28, 28' control piston in clutch-regulating valve
29 control valve in activation valve
30 control valve in self-maintaining valve
31 resetting spring in self-maintaining valve
32 resetting spring in activation valve
33, 33' resetting spring in clutch-regulating valve
34, 34' short control valve in clutch-regulating valve
36 valve borehole of the self-maintaining valve
38 pressure chamber in self-maintaining valve
39 pressure chamber in self-maintaining valve
40 control piston on self-maintaining valve
41 line
42 line
43 pressure chamber of self-maintaining valve
44 pressure chamber of activation valve
45 pressure chamber of clutch-regulating valve
46 pressure chamber of self-maintaining valve
47 pressure chamber in activation valve
48 line clutch-regulating valve 3'-clutch selector valve
49 line clutch-regulating valve 3'-clutch selector valve
50 two-way valve
51 pressure chamber of clutch selector valve
52 pressure chamber of clutch selector valve
53 pressure chamber of clutch selector valve
54 pressure chamber of clutch selector valve
55 pressure chamber of clutch selector valve
56 pressure chamber of clutch selector valve
57 pressure chamber of clutch selector valve
58 locking device on of clutch selector valve
59 line
60 line
61 control piston of clutch selector valve
62 control piston of clutch selector valve
63 borehole for control valve in activation valve
64 borehole for long control valve in clutch activation valve
65 borehole for short control valve in clutch activation valve
66 control valve for clutch selector valve
67 line clutch selector valve-pressure chamber 80
70 pressure chamber of self-maintaining valve
71 control piston of clutch selector valve
72 pressure chamber of activation valve
73 pressure chamber of activation valve
74 pressure chamber of clutch-regulating valve
75, 75' pressure chamber of clutch-regulating valve
76, 76' pressure chamber of clutch-regulating valve
77, 77' pressure chamber of clutch-regulating valve
78, 78' pressure chamber of activation valve
80, 80' pressure chamber of clutch-regulating valve
81 line
82 line
83 line
84 line
85 line
86 pressure chamber
87 pressure chamber
88 pressure chamber
89 line
143 pressure chamber of self-maintaining valve
146 line
147 pressure chamber of self-maintaining valve able to be emptied
148 control piston of self-maintaining valve
152, 152' line P_VST1
166 electrically activated pressure regulating valve
168, 168' electrically activated pressure regulating valve
A-A curve course
A-B curve course
P_A activation pressure
P_D rotational speed-dependent, control pressure
P_K, P_K' clutch activation pressure
P_K1-P_K4 clutch activation pressures
P_V1 supply pressure
P_V2 pilot pressure
P_VST1 pilot pressure
P_VST2 pilot pressure
P_VST3 pilot pressure
$t_0, t_1, t_2, t_3$ time

The invention claimed is:

1. A control valve arrangement for activating and controlling at least one start-up clutch of a vehicle automatic transmission during one of a hydraulic emergency operation caused by an electronic control device failure or an absence of a pilot pressure (P_VST3), the valve arrangement comprising:

at least one pressure regulating valve (166) being controlled by the electronic control device to supply the control valve arrangement with the pilot pressure (P_VST3);

at least one clutch regulating valve (3, 3', 3") directing a flow of supply pressure (P_V1) to a pressure chamber of a clutch activation device (4, 4');

a self-maintaining hydraulic unit comprising a self-maintaining valve (1) and an activation valve (2) and sustains engagement of the at least one start-up clutch during the hydraulic emergency operation;

the self-maintaining valve (1) communicating with the activation valve (2) and directing an activation pressure (P_A) to the activation valve (2) depending on a control pressure (P_D), which is dependent upon at least one of a motor rotational speed and a transmission output rotational speed and the activation valve (2) directs the activation pressure (P_A) to the at least one clutch-regulating valve (3, 3', 3");

the control valve arrangement controlling one of activation and de-activation of the hydraulic emergency operation with a clutch activation pressure (P_K, P_K');

the clutch activation pressure (P_K, P_K') being passable through a first line (41), a pressure chamber (44) of the activation valve (2) and a second line (42) to a pressure chamber (43) of the self-maintaining valve (1), and the clutch activation pressure (P_K, P_K') being passable from the pressure chamber (43) of the self-maintaining valve (1) through a third line (47) to a pressure chamber (38) which is located at an end of the self-maintaining valve (1) opposite a resetting spring (31) of the self-maintaining valve (1).

2. The control valve arrangement according to claim 1, wherein upon activation of the hydraulic emergency operation if the control pressure (P_D) is sufficiently high, a shift condition of the clutch activation device (4) existing at the activation of the hydraulic emergency operation is retained.

3. The control valve arrangement according to claim 1, wherein the first pressure chamber (44) of the activation valve (2), through which the clutch activation pressure (P_K, P_K') passes, is blocked by a center control piston (148) of a control valve (29) of the activation valve (2), when the pilot pressure (P_VST3), characterizing normal operation, is present in a second pressure chamber (78) of the activation valve (2) which is located at an end of the activation valve (2) opposite from a resetting spring (32) of the activation valve (2).

4. The control valve arrangement according to claim 1, wherein the activation pressure (P_A) is supplied from the self-maintaining valve (1), via a fourth line (14), to the activation valve (2) and from the activation valve (2), via a fifth line (15), to a pressure chamber (80, 80') located at an end of the clutch regulating valve (3, 3', 3") opposite a resetting spring (33, 33') of the clutch regulating valve (3, 3', 3"), when the pilot pressure (P_VST3) ceases flowing to the activation valve (2) and the clutch activation pressure (P_K, P_K') is high, the clutch activation pressure (P_K, P_K') displaces a control valve (30) of the activation valve (1) against a force of a resetting spring (31) of the activation valve (1) such that a control piston (20) of the self-maintaining valve (1) opens communication between a third pressure chamber (70) and a fourth pressure chamber (143) of the self-maintaining valve (1).

5. The control valve arrangement according to claim 1, wherein when the pilot pressure (P_VST3) ceases flowing to the activation valve (2) and the clutch activation pressure (P_K, P_K') is high, the rotational speed-dependent control pressure (P_D) directed to a control valve (30) of the self-maintaining valve (1) presses against a force of the resetting spring (31) of the self-maintaining valve (1).

6. The control valve arrangement according to claim 1, wherein the at least one clutch-regulating valve (3, 3") has a short control valve (34, 34') and a long control valve (19, 19') and, during emergency operation, the activation pressure (P_A) is directed to the short control valve (34, 34') which then biases the long control valve (19, 19').

7. The control valve arrangement according to claim 1, wherein a first clutch-regulating valve (3) has a short control valve (34) and a long control valve (19) and, during emergency operation, the activation pressure (P_A) is directed to the short control valve (34, 34') of the first clutch-regulating valve (3) such that the short control valve (34, 34') urges the long control valve (19, 19'), and a second clutch-regulating valve (3') includes a single long control valve (19').

8. The control valve arrangement according to claim 1, wherein the activation pressure (P_A) directed first to one of the activation valve (2) and the self-maintaining valve (1) and through another of the self-maintaining valve (1) and the activation valve (2) to the clutch selector valve (8).

9. A control valve arrangement to control activation of at least one start-up clutch of a vehicle automatic transmission comprising:

at least one clutch-regulating valve (3, 3', 3") across which a supply pressure (P_V1) being passed into a pressure chamber of an associated clutch activation device (4, 4');

a pressure regulating valve (166) being controlled by an electronic control device;

at least one control valve of the control valve arrangement being supplied with a pilot pressure (P_VST3);

a self-maintaining hydraulic unit with whose help a hydraulic emergency operation being maintained with an engaged start-up clutch upon failure of the electronic control device and thus the absence of the pilot pressure (P_VST3) during operational situations;

the self-maintaining hydraulic unit to achieve the emergency operation function having a self-maintaining valve (1) and an activation valve (2), the self-maintaining valve (1) being so constructed to direct an activation pressure (P_A) depending on a control pressure (P_D) to the activation valve (2), the activation valve (2) being able to direct the activation pressure (P_A) to the at least one clutch-regulating valve (3, 3");

a means with which activation or de-activation of the hydraulic emergency operation being controlled by a clutch activation pressure (P_K, P_K');

the at least one clutch-regulating valve (3, 3") including a first clutch-regulating valve (3), which is acted upon by the activation pressure (P_A) from the activation valve (2), on which pilot pressures (P_VST1 and P_VST2) act on the first clutch-regulating valve (3) and a second clutch-regulating valve (3') during normal operation with whose help the clutch activation pressure (P-K and P-K') from the supply pressure (P_V1) directed to both the first and the second clutch-regulating valves (3, 3') to regulate a first and a second clutch activation devices (4, 4') and at which a higher clutch activation pressure (P_K, P_K') being directed with a two-way valve (50) through the activation valve (2) to a pressure chamber (38) of the self-maintaining valve (1) opposite a resetting spring (31) of the self-maintaining valve (1).

10. The control valve arrangement according to claim 9, wherein upon activation of the hydraulic emergency operation, if the control pressure (P_D) is sufficiently high, one of the first and the second clutch activation devices (4, 4') is one of engaged and remains engaged, when the one of the first and the second clutch activation devices (4, 4') was one of slidably engaged and engaged prior to the activation of the hydraulic emergency operation.

11. The control valve arrangement according to claim 9, wherein upon activation of the hydraulic emergency operation, if the control pressure (P_D) is sufficiently high, the first clutch activation device (4) is one of engaged and remains engaged, when the first clutch activation devices (4) was one of slidably engaged and engaged prior to the activation of the hydraulic emergency operation.

12. The control valve arrangement according to claim 9, wherein both of the first and the second clutch-regulating valves (3, 3') have a short control valve (34, 34') and a long control valve (19, 19') and, during emergency operation, the activation pressure (P_A) is directed to the short control valve (34, 34') of the clutch-regulating valve (3, 3') with which the start-up clutch was one of previously engaged and slidably engaged, via the associated clutch activation device (4, 4').

13. The control valve arrangement according to claim 12, wherein a pressure chamber (74, 74') in an area of a free end of a long control valve (19, 19') of the clutch-regulating valve (3, 3', 3") is acted upon with the pilot pressure (P_VST1, P_VST2) with which the control valve (19, 19') is displaced against a rest force of the resetting spring (33, 33') acting on the long control valve (19, 19') after a de-activation of the rotational speed-dependent self-maintaining function of the self-retaining valve (1) and the supply pressure (P_V1, P_V2) directed to the clutch-regulating valve (3, 3', 3") as the clutch activation pressure (P_K, P_K') directed to each the first and the second clutch activation devices (4, 4').

14. The control valve arrangement according to claim 12, further comprising a clutch selector valve (8) which, upon activation of the emergency operation function, one of the first and the second clutch activation devices (4, 4'), which was activated to engage, one of further engages and further activates the associated clutch slidably engage.

15. The control valve arrangement according to claim 14, wherein the clutch selector valve (8) is a pressure balance which directs the clutch activation pressure (P_K'), for activation of the second clutch (4'), to a first pressure chamber (51) and a second pressure chamber (51, 52) at axial ends of the clutch selector valve (8), the two pressure chambers (51, 52) are axially bounded by a large diameter control piston (61) and a small diameter control piston (62), a third control piston (71) axially connects directly to the small diameter control piston (62) and has free end face, compared to the control piston with the smaller diameter (62), is urged in a pressure chamber (53) by the clutch activation pressure (P_K), and end face of the third control piston (71) facing the large diameter control piston (61) and an end face of the larger diameter control piston (61) facing the third control piston (71) are acted upon by the activation pressure (P_A) in associated pressure chambers (55, 56) and the activation pressure (P_A), which depends on a position of a control valve (66) of the clutch selector valve (8), is directed to one of a fifth pressure chamber (80) of the first clutch-regulating valve (3), opposite a resetting spring (33) of the first clutch-regulating valve (3), and a pressure chamber (80') of the second clutch-regulating valve (3") opposite a resetting spring (33') of the second clutch-regulating valve (3").

16. The control valve arrangement according to claim 14, wherein the clutch selector valve (8) has a spring-loaded locking device (58).

* * * * *